(12) United States Patent
Fisher et al.

(10) Patent No.: US 9,564,728 B2
(45) Date of Patent: Feb. 7, 2017

(54) ELECTRICALLY CONDUCTIVE BUSHING CONNECTION TO STRUCTURE FOR CURRENT PATH

(71) Applicant: The Boeing Company, Chicago, IL (US)

(72) Inventors: Robert E. Fisher, Everett, WA (US); James P. Irwin, Renton, WA (US)

( * ) Notice: Subject to any disclaimer, the term of this patent is extended or adjusted under 35 U.S.C. 154(b) by 277 days.

(21) Appl. No.: 14/304,072

(22) Filed: Jun. 13, 2014

(65) Prior Publication Data

US 2014/0291884 A1 Oct. 2, 2014

Related U.S. Application Data

(62) Division of application No. 12/970,827, filed on Dec. 16, 2010.

(51) Int. Cl.
| | |
|---|---|
| *H01R 43/16* | (2006.01) |
| *B64D 37/32* | (2006.01) |
| *B64D 45/02* | (2006.01) |
| *H02G 3/18* | (2006.01) |
| *F16B 1/00* | (2006.01) |

(52) U.S. Cl.
CPC ............ *H01R 43/16* (2013.01); *B64D 37/32* (2013.01); *B64D 45/02* (2013.01); *H02G 3/18* (2013.01); *F16B 2001/0064* (2013.01); *Y10T 29/49002* (2015.01); *Y10T 29/49204* (2015.01)

(58) Field of Classification Search
CPC ....... B21D 39/031; B21D 39/04; B21D 39/06; B21D 51/12; B21D 53/10; H01R 43/16; Y10T 29/49204; Y10T 29/49218; Y10T 29/49954; Y10T 29/49963; F16B 2001/0064; B23P 11/00; B23P 11/02
See application file for complete search history.

(56) References Cited

U.S. PATENT DOCUMENTS

| | | | | |
|---|---|---|---|---|
| 2,155,626 | A * | 4/1939 | Weiss ................. | B21L 9/00 59/35.1 |
| 2,817,363 | A * | 12/1957 | Penrose ............... | B21D 15/04 138/122 |
| 3,143,794 | A * | 8/1964 | Martin-Hurst ...... | B21D 15/06 138/121 |
| 3,217,529 | A * | 11/1965 | Malmede ............. | B21D 17/04 72/415 |
| 3,532,024 | A | 10/1970 | Gutshall | |
| 4,102,030 | A | 7/1978 | King | |

(Continued)

FOREIGN PATENT DOCUMENTS

| | | |
|---|---|---|
| CN | 1011536 A | 4/2008 |
| EP | 0425292 A1 | 5/1991 |

(Continued)

*Primary Examiner* — Edward Tolan

(57) ABSTRACT

An electrically conductive structural connection employs a pass through or fastener having a first diameter. A fastener hole, with a second diameter larger than the diameter of the pass through, extends through a thickness of a structure and receives the pass through. A bushing having a diameter and a thickness to fit between the first and second diameters extends though and past the thickness of said structure. When the feedthrough is compressively secured to the structure, the bushing expands radially between the first diameter and the second diameter to maintain at least one contact point between the fastener and the structure.

19 Claims, 9 Drawing Sheets

(56) References Cited

U.S. PATENT DOCUMENTS

| | | | | |
|---|---|---|---|---|
| 4,189,977 A | * | 2/1980 | Hintz | F16B 21/20 |
| | | | | 411/34 |
| 4,842,310 A | * | 6/1989 | Muffke | B60T 17/04 |
| | | | | 285/334.5 |
| 5,054,983 A | * | 10/1991 | Froewis | E04B 1/7633 |
| | | | | 411/480 |
| 7,576,966 B2 | | 8/2009 | Heeter | |
| 8,230,566 B2 | * | 7/2012 | Oguri | B25B 27/062 |
| | | | | 254/98 |
| 2003/0044256 A1 | | 3/2003 | Nickerson et al. | |
| 2008/0075555 A1 | | 3/2008 | March et al. | |
| 2008/0078864 A1 | | 4/2008 | Wilkerson | |

FOREIGN PATENT DOCUMENTS

| | | | | |
|---|---|---|---|---|
| EP | 1903221 A2 | 3/2008 | | |
| FR | 1555409 A | * 12/1968 | | B21C 37/157 |

\* cited by examiner

ELECTRICALLY CONDUCTIVE BUSHING CONNECTION TO STRUCTURE FOR CURRENT PATH

REFERENCE TO RELATED APPLICATIONS

This application is a divisional of application Ser. No. 12/970,827 filed on Dec. 16, 2010 entitled ELECTRICALLY CONDUCTIVE, BUSHING CONNECTION TO STRUCTURE FOR CURRENT PATH having a common assignee with the present application, the disclosure of which is incorporated herein by reference.

BACKGROUND INFORMATION

1. Field

Embodiments of the disclosure relate generally to fittings for electrical continuity and conductivity and more particularly to embodiments for a compressible expanding bushing having contact points for electrical continuity through a hole in carbon fiber resin composite beams to carry streaming current and lightning induced currents that must be connected to structure electrically to prevent a spark being formed.

2. Background

The use of Carbon Fiber Reinforced Polymer (CFRP) composites in structural applications for aerospace vehicles and other systems is now common practice. Certain structural systems require conductive capability for lightning protection and other electrical applications that metal structure has always naturally provided. However, CFRP structures lack the same conductive capabilities as metal structures. In particular, holes through CFRP structures may create conditions for sparking due to lack of continuous electrical conductivity. For applications such as fuel tank structures pass through fittings require holes in the structure to accommodate hydraulic lines, sensors and other systems. As an example, hydraulic bulkhead fittings through CFRP composite beams carry streaming current and lightning induced currents that must be connected to structure electrically to prevent a spark being formed within a fuel tank installation.

To accommodate such requirements in an example system, a precision hole was formed in the CFRP beam and a metal bushing was press fitted into the hole with sufficient interference to maintain contact with the carbon fiber extending to the inside diameter of the hole. This requires a precision diameter hole be formed in CFRP material to accept a precision outside diameter bushing in order to create contact pressure between the inside of the hole and outside of the bushing. This contact pressure is required for conducting electrical current from the bolt that passes through the bushing to the carbon fibers that extend to the inner surface of the through hole. The existing construction typically requires an exotic material with very low thermal coefficient of expansion to match the CFRP. This contact pressure is required to complete an electrical circuit with sufficient current carrying capacity to dissipate current induced on the hydraulic tubes. High precision is required to assure contact pressure is maintained against the carbon fibers in the inside diameter of installation holes mounting the bulkhead fitting.

CFRP structures may additionally have corrosion issues with respect to certain materials. Consequently, selection of a precision metal bushing additionally requires anticorrosion compatibility with the CFRP structure in addition to the thermal expansion considerations. This may significantly limit material selection.

It is therefore desirable to provide a current carrying bushing with electrical contact capability which eliminates the requirement for precision boring and precision machining of fittings. It is also desirable to provide a bushing which does not require costly materials to maintain thermal expansion matching while retaining anticorrosion compatibility with the CFRP.

SUMMARY

Embodiments disclosed herein provide an electrically conductive structural connection which employs a pass through or fastener having a first diameter. A fastener hole, with a second diameter larger than the diameter of the pass through, extends through a thickness of a structure and receives the pass through. A bushing having a diameter and a thickness to fit between the first and second diameters extends though and past the thickness of said structure. When the pass through is compressively secured to the structure, the bushing expands radially between the first diameter and the second diameter to maintain at least one contact point between the fastener and the structure.

The features, functions, and advantages that have been discussed can be achieved independently in various embodiments of the present disclosure or may be combined in yet other embodiments further details of which can be seen with reference to the following description and drawings.

DETAILED DESCRIPTION

Figure 1:
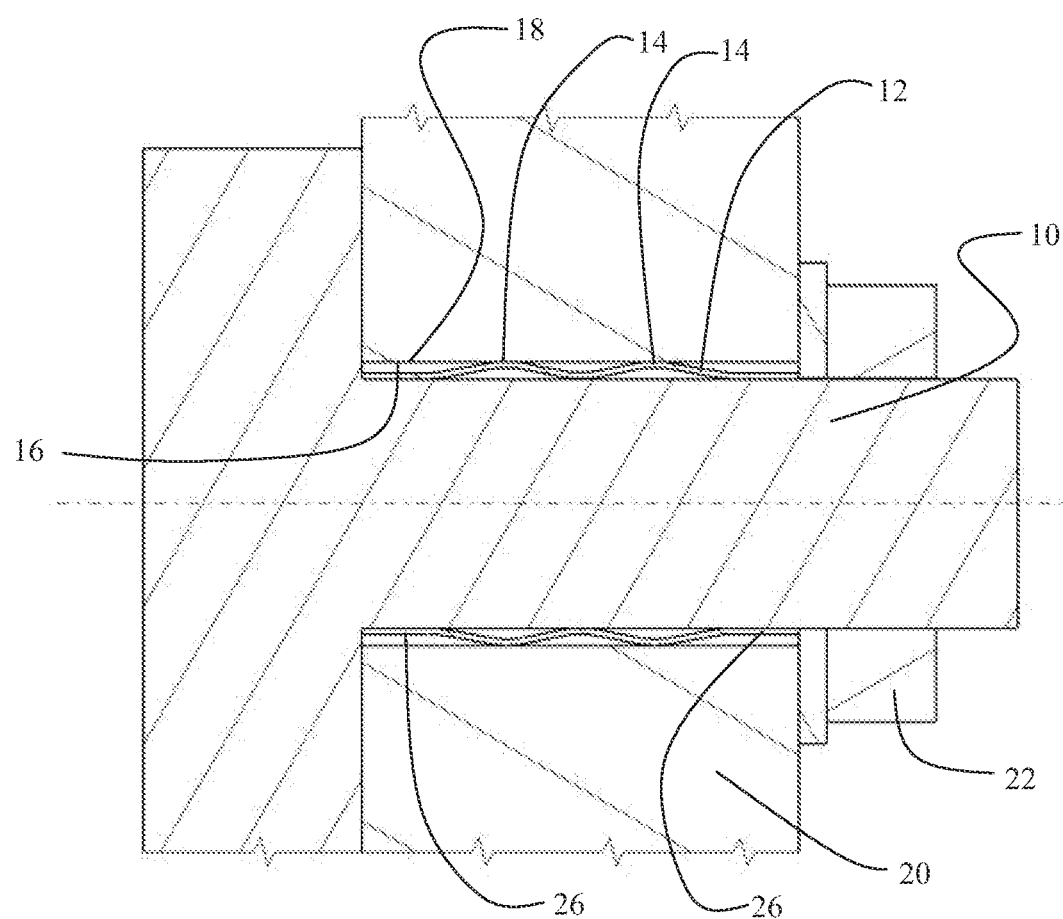
FIG. 1 is a section view of a first embodiment of a compressible conductive bushing with multiple contact points for a bolt feedthrough.

The embodiments described herein demonstrate an expanding bushing that maintains contact pressure on the inside of a close fitting hole to conduct electrical current from a through bolt or pass through to the supporting structure without sparking. Referring to the drawings, FIG. 1 shows an example pass through fastener such as bolt 10 having a first diameter inserted through an expanding bushing 12 with multiple circumferential contacts 14 to maintain required pressure of the bushing against the inside wall 16 of an installation hole 18 having a second diameter in CFRP structure 20. The bushing 12 initially extends past the extents of the hole in an uncompressed condition. Spring pressure is created by tightening nut 22 on the bolt (threads on the nut and bolt are not shown for simplicity) and compressing the length of the bushing, as will be described in greater detail subsequently. The length compression causes the bushing to increase in diameter on the outside and decrease in diameter on the inside. The thermal coefficient of expansion of the bushing material is of reduced concern since the contact between the CFRP and the bushing contact points can be maintained due to the elastic spring force over a large range of temperatures. Consequently a much less costly material can be used for the bushing.

Figure 2:
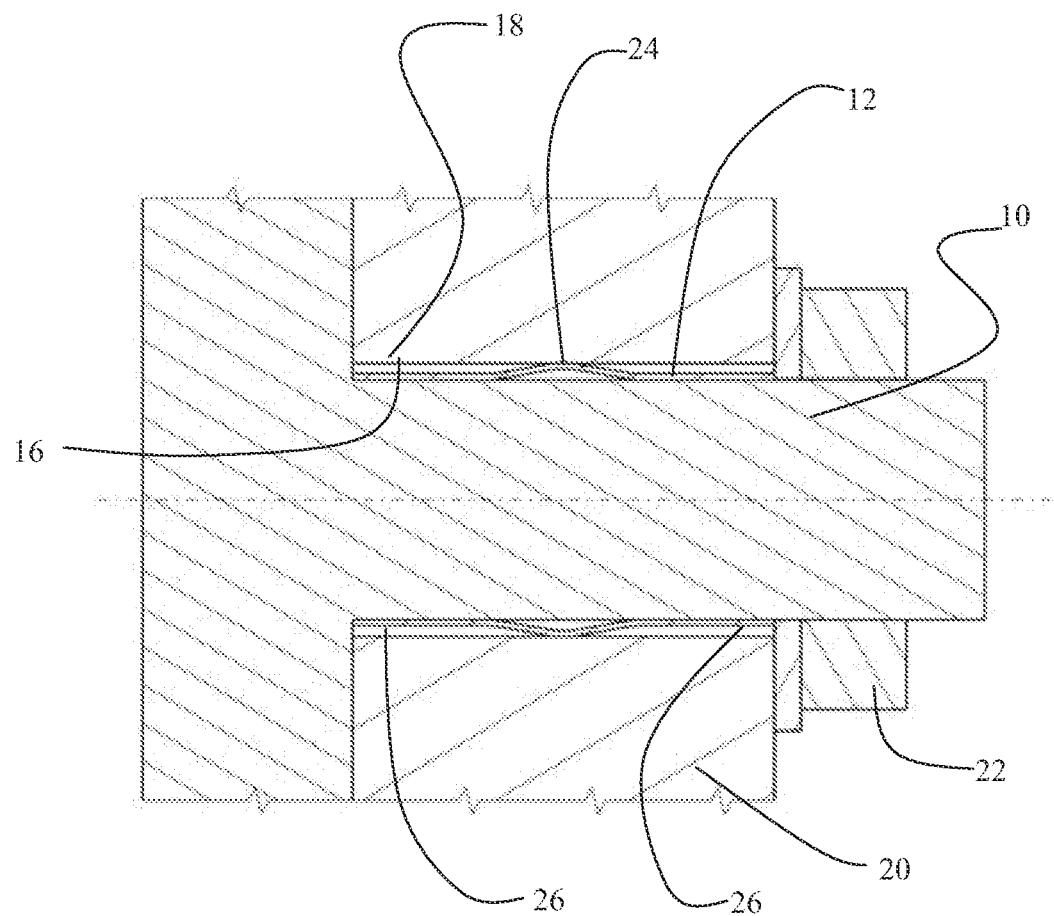
FIG. 2 is a section view of a second embodiment of a compressible conductive bushing with single contact points for a bolt feedthrough.

A second embodiment is shown in FIG. 2 wherein an expanding bushing 12 with one circumferential contact 24 maintains required pressure of the bushing against the inside diameter 16 of the installation hole 18 in CFRP structure 20. As with the first embodiment, spring pressure is created by tightening nut 22 on the bolt and compressing the length of the bushing. The length compression causes the bushing to increase its diameter on the outside and decrease in its inside diameter. For both the first and second embodiments, bushing 12 has end sections 26 which have a diameter to be closely received on the bolt 10.

The embodiments disclosed, in FIGS. 1 and 2 may be used with, for example, a flange attachment to the CFRP structure with a bolt pattern, each bolt in the pattern being received through a hole in the CFRP structure as described. Such bolts may range in size from 5/16 inch to 3/8 inch or larger. In applications of that type, a 0.020 inch thickness tube of stainless steel or titanium may be employed as a precursor for fabrication of the compressible bushing, as will be describe in greater detail subsequently.

Figure 3:
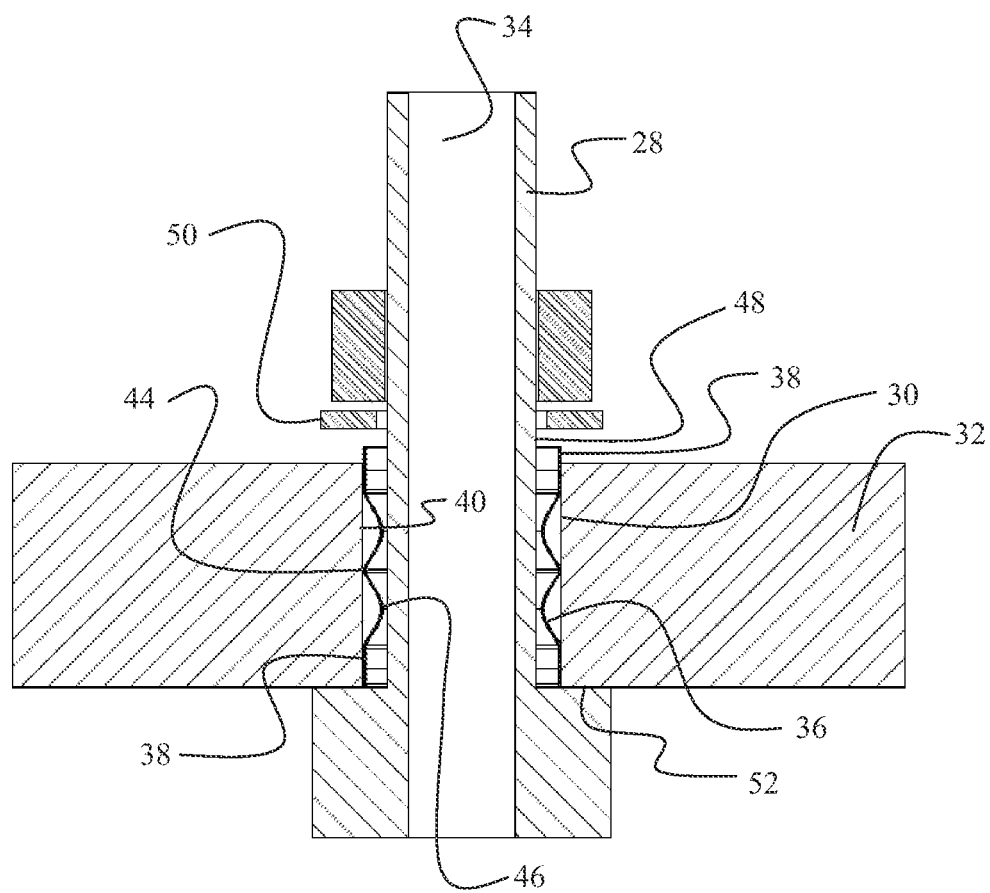
FIG. 3 is an exploded side section view of a third embodiment of a compressible conductive bushing with multiple contact points for a hydraulic feedthrough in the uncompressed condition.
Figure 4:
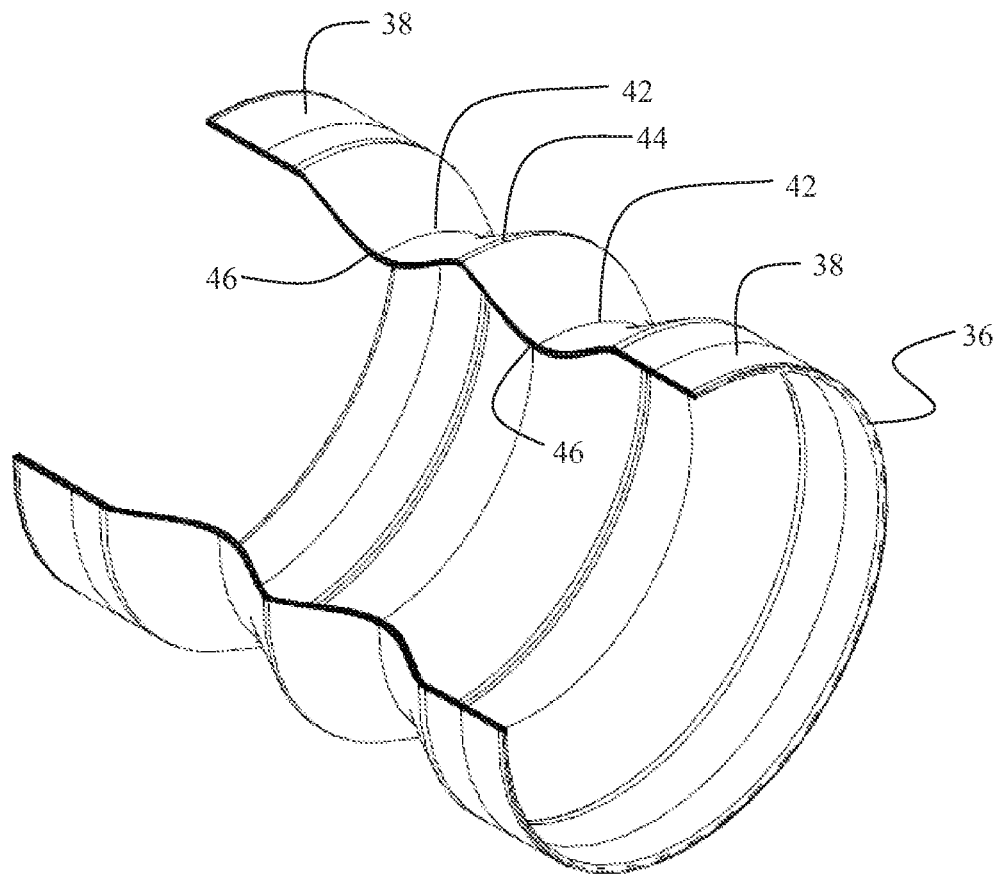
FIG. 4 is a detailed isometric partial section view of the compressible conductive bushing of FIG. 3.

A third embodiment is shown in FIG. 3 for a pass through 28 received through a hole 30 in a CHU structure 32. The pass through may be significantly larger in diameter than the bolts discussed with respect to the embodiments of FIGS. 1 and 2 with diameters of up to 1.0 inch or greater. For the embodiment shown, the pass through incorporates a central bore or channel 34 and may constitute a hydraulic line, an electrical conduit or comparable structure. Bushing 36, shown in detail in FIG. 4, incorporates end portions 38 having a diameter to be received in close contact with inner diameter 40 of hole 30 and is shown in the uncompressed state in FIG. 3. Accordion pleats 42 formed in the bushing, as will be described in greater detail subsequently, expand diametrically, inward and outward, upon compression of the bushing axially to provide outer contact points 44 for engagement of the inner diameter 40 of hole 30 and inner contact points 46 for contact with outer diameter 48 of the pass through 28. For the embodiment shown, two pleats are employed providing one outer diameter contact (with the hole in the CFRP structure) and two inner diameter contacts (with the pass through). In alternative embodiments, additional pleats may be employed for additional contacts.

Figure 5:
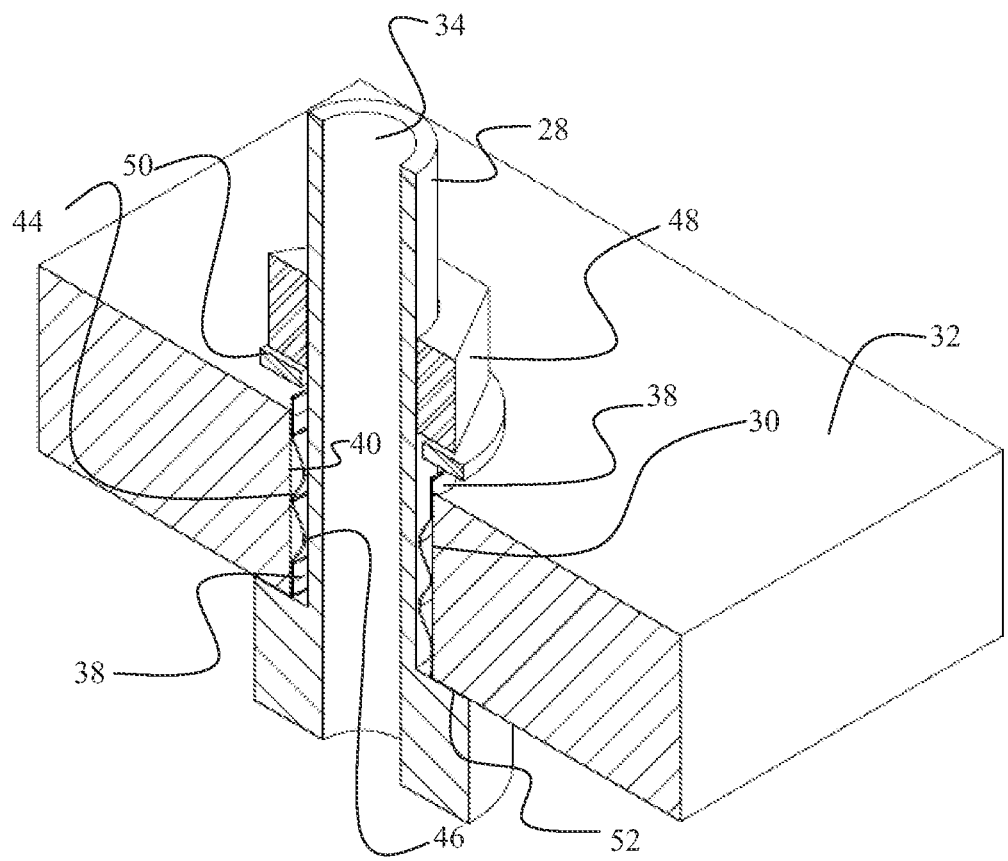
FIG. 5 is an isometric view of the embodiment of FIG. 3 with the uncompressed bushing.

In the uncompressed condition as shown in FIGS. 3 and 5, the bushing extends beyond the hole in the CFRP structure to be engaged for compression. Nut 48 is received on mating external threads (not shown for simplicity) on the pass through and engages a bearing washer 50 which contacts the bushing 36. Upon tightening of the nut 48 to secure the feedthrough in the hole of the CFRP structure 32, end portions 38 of the bushing are engaged by the bearing washer 50 on a first end and a shoulder 52 on the feedthrough on a second end. In alternative embodiments nuts with associated washers may be employed to secure the feedthrough on both sides of the CFRP structure and compress the bushing.

Figure 6:
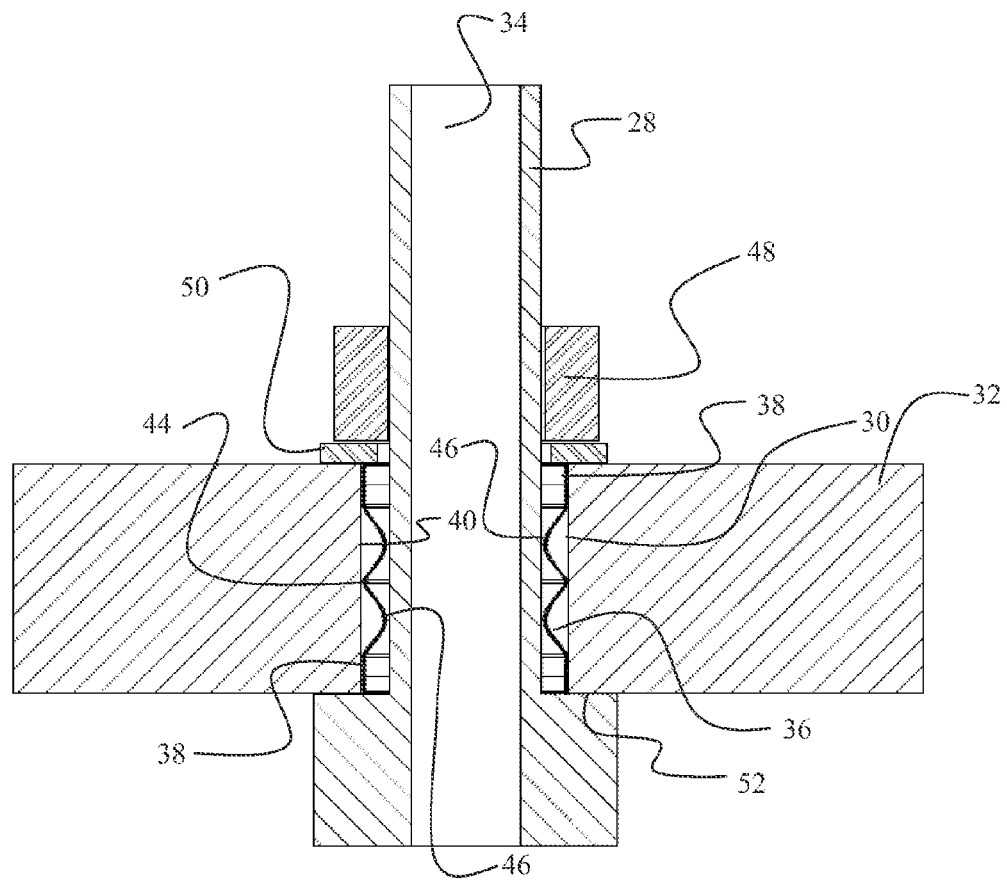
FIG. 6 is a section view of the embodiment of FIG. 3 in the compressed condition.
Figure 7:
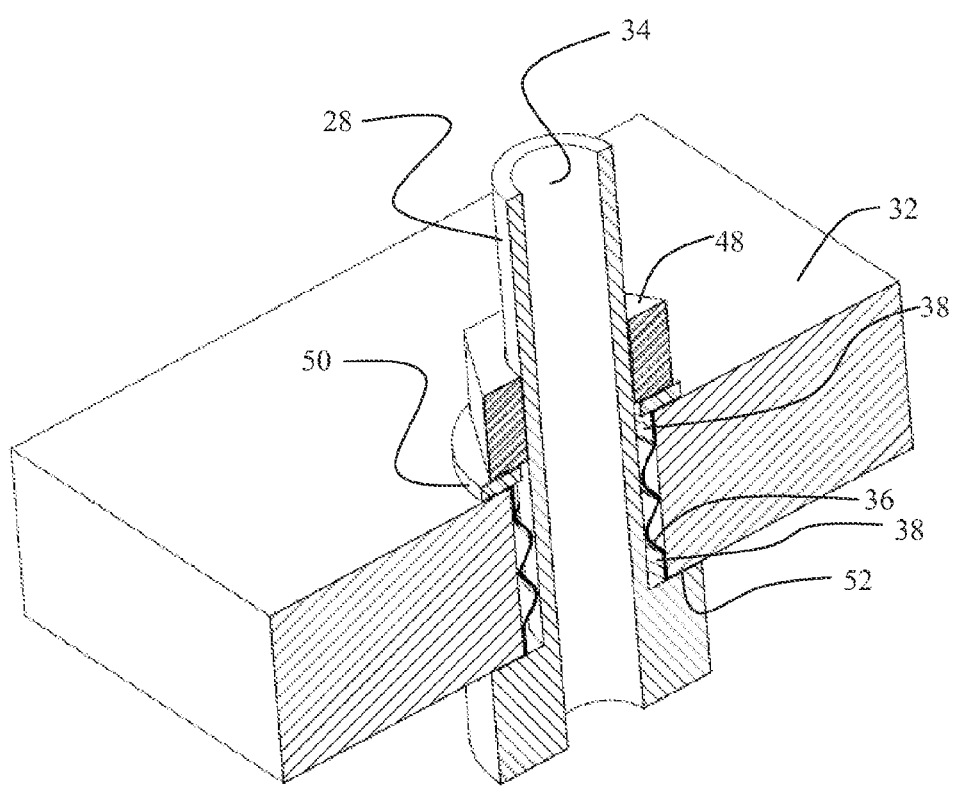
FIG. 7 is an isometric view of the embodiment of FIG. 3 in the compressed condition.
Figure 8:
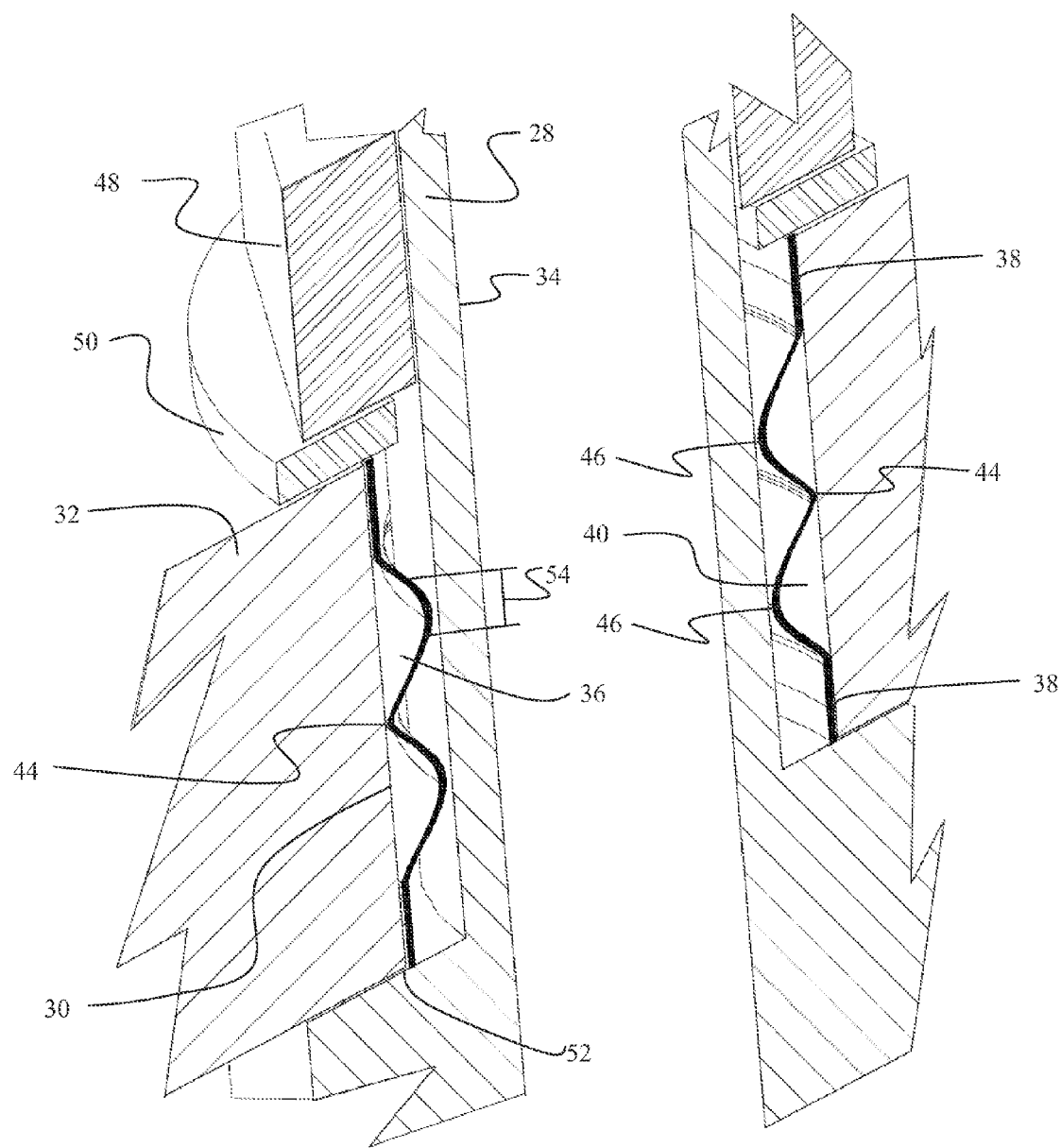
FIG. 8 is a detailed view of the bushing interface with the hole and feedthrough; and, FIG. 9 is a flowchart for a method to manufacture and employ the compressible bushing.

The bushing in the compressed state is shown in FIGS. 6, 7 and 8. The overall length of the bushing 36 including the end portions 38 and the number and depth of the accordion pleats 42 in the bushing are selected to accommodate the required expansion for firm electrical contact with both the pass through 28 and CFRP hole 30 when compressed by the nut and bearing washer. Preferably the bushing 36 remains elastically deformed to provide spring force to accommodate thermal expansion and contraction of the CFRP and pass through elements. The vertex of the pleats 42 may additionally be contoured as shown in FIG. 8 to provide a bight 54 which flattens against the opposing surface (pass through or hole) to accommodate additional diametric expansion of the bushing during axial compression thereby further reducing tolerancing requirements. Flattening of the bight 54 provides additional contact surface to further enhance the electrical properties.

For any of the three embodiments disclosed, the end portions of the bushings may be scored or shaped to diametrically expand (or contract) under compression of the bushing for firm contact with the hole or pass through adjacent which they are closely received thereby adding further contact area for electrical conductivity. Additionally, while the first embodiment shows both end portions closely received by the bolt on an inner diameter of the bushing and the second embodiment shows both end portions closely received by the hole on an outer diameter, in alternative embodiments, one end portion may be in close contact on the inner diameter (with the bolt or pass through) while the opposite end portion may be in close contact on the outer diameter (with the hole in the CFRP structure). In yet other alternative embodiments, the end portions may have a diameter placing the end portion intermediate the hole diameter and feedthrough diameter. The number and shaping of accordion pleats may be chosen based on expansion and conductivity requirements. While bolt and a hydraulic or electrical pass through have been employed as exemplary elements, any externally threaded element extending through a hole in the CFRP structure may employ the continuity contact capability of the compressible bushing as disclosed in the embodiments herein.

The embodiments described additionally provide the benefit of easy disassembly, if required, for removal of the feedthrough or bolts with significantly reduced potential for damage of the CFRP structure over a precision press fit bushing in a precision hole. Maintaining the sizing of the compressible bushing for elastic deformation results in relaxation of the diametric pressure exerted by the bushing upon withdrawal of the compressing nut and washer. Even if some plastic deformation has occurred, the relatively thin wall section of the compressible bushing allows stretching of the bushing for removal without excessive forces.

Figure 9:
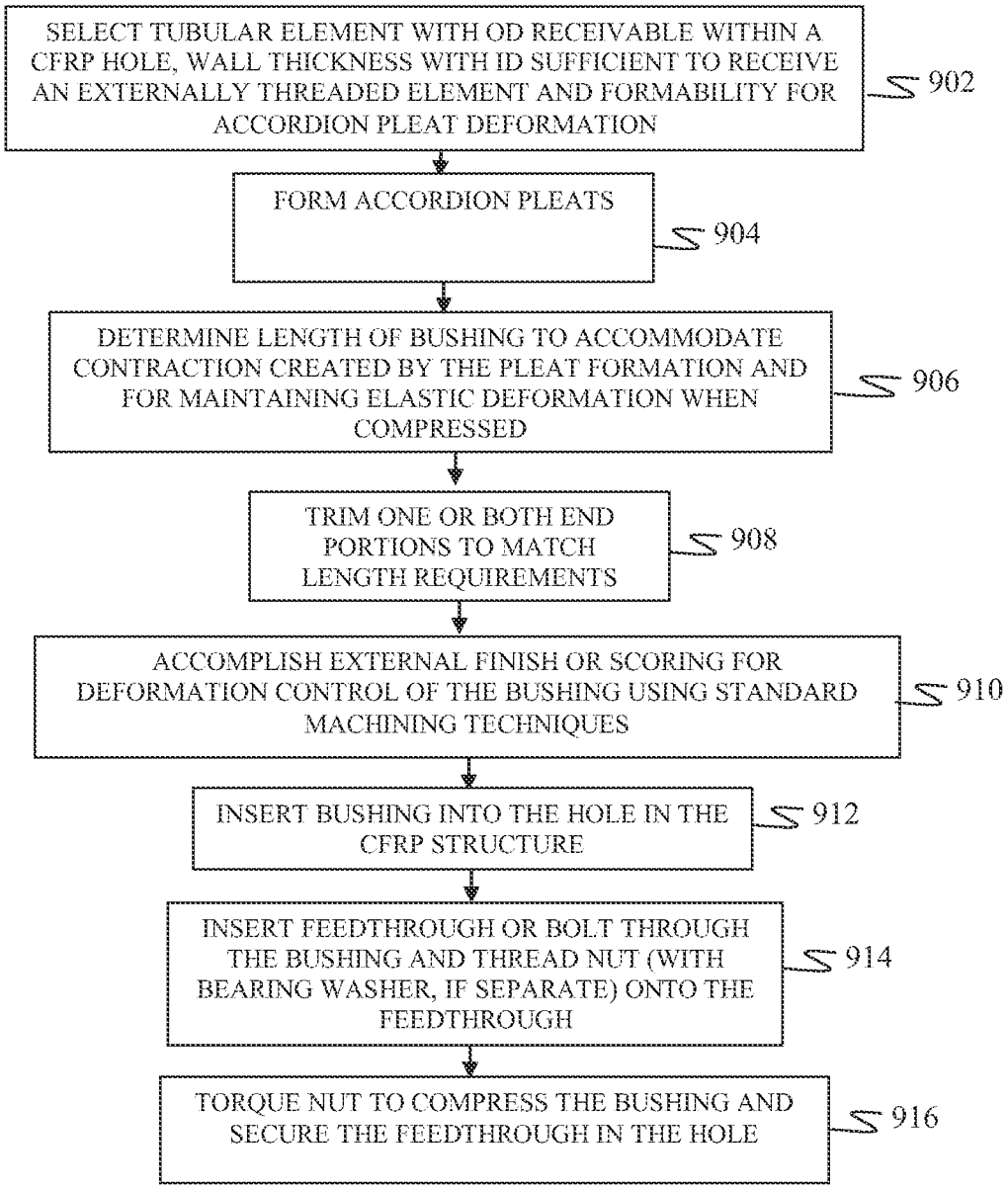

A method for fabrication and use of the compressible bushing is described in FIG. 9. Initial fabrication of the bushing may be accomplished by selection of a tubular element with an outer diameters receivable within a CFRP hole and a wall thickness with inner diameter sufficient to receive an externally threaded element and formability for accordion pleat deformation, step 902. For exemplary bushings titanium or stainless steel may be employed for anti-corrosion compatibility with the CFRP. A three roller deformation system may be employed with a roller pair external to the tube and a matching roller internal to the tube between the external roller pair for forming of accordion pleats, step 904. Length of the bushing is determined to accommodate any contraction of the tube created by the pleat formation and for maintaining elastic deformation in the bushing when compressed in service, step 906, and trimming of the one or both end portions to match length requirements may be accomplished after pleating, step 908. External finishing or scoring for deformation control of the bushing may be accomplished using standard machining techniques, step 910.

For assembly, compressible bushing is inserted into the hole in the CFRP structure, step 912. The feedthrough or bolt is inserted through the bushing and the nut (with bearing washer, if separate) is threaded onto the feedthrough, step 914. The nut is then torqued to compress the bushing and secure the feedthrough in the hole, step 916.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A method for fabrication of an electrically conductive bushing for holes in carbon fiber reinforced polymer (CFRP) structures comprising:
   selecting a tubular element with an outer diameter receivable within a CFRP hole having a wall thickness with inner diameter sufficient to receive an externally threaded element and formability for deformation to form a plurality of accordion pleats;
   deforming the tubular element to form the plurality of accordion pleats less than a diameter of the CFRP hole; and,
   determining length of a bushing to accommodate any contraction of the tubular element created by the pleat formation to assure contact of each pleat with the CFRP hole and the externally threaded element and for maintaining elastic deformation in the bushing when compressed in service.

2. The method of claim 1 further comprising:
   employing a three roller deformation system with a roller pair external to the tube and a matching roller internal to the tube between the external roller pair for forming of accordion pleats.

3. The method of claim 1 further comprising:
   trimming of one or both end portions to match length requirements after pleating.

4. The method of claim 1 further comprising:
   external finishing or scoring for deformation control of the bushing.

5. The method of claim 4 wherein the finishing or scoring is conducted on end portions of the bushing for deformation against the hole or feedthrough.

6. The method of claim 1 wherein the step of deforming the tubular element further comprises determining a number and depth of the accordion pleats to accommodate required expansion for firm electrical contact with both a pass through and a CFRP hole when compressed by a nut and bearing washer.

7. The method of claim 1 wherein the step of deforming the tubular element further comprises contouring a vertex of the accordion pleats to provide a bight which flattens against an opposing surface.

8. The method of claim 1 wherein the step of deforming the tubular element further comprises forming the accordion pleats with both end portions of the tubular element terminating at an inner diameter to be closely received by the externally threaded element.

9. The method of claim 1 wherein the step of deforming the tubular element further comprises forming the accordion pleats with both end portions of the tubular element terminating at an outer diameter to be closely received by a CFRP hole.

10. The method of claim 1 wherein the step of deforming the tubular element further comprises forming the accordion pleats with one end portion of the tubular element terminating at an inner diameter to be closely received by the externally threaded element and a second end portion of the tubular element terminating at an outer diameter to be closely received by a CFRP hole.

11. The method of claim 1 wherein the step of deforming the tubular element further comprises forming the accordion pleats with end portions having a diameter placing intermediate a hole diameter and diameter of the externally threaded element.

12. The method of claim 8 wherein the step of deforming the tubular element comprises forming two pleats providing one outer diameter contact and two inner diameter contacts.

13. The method of claim 9 wherein the step of deforming the tubular element comprises forming two pleats providing one inner diameter contact and two outer diameter contacts.

14. A method for fabrication of an electrically conductive bushing for holes in carbon fiber reinforced polymer (CFRP) structures comprising:
   selecting a tubular element having a plurality of accordion pleats with an outer diameter receivable within a CFRP hole having a wall thickness and with inner diameter sufficient to receive an externally threaded element and formability;
   deforming the tubular element by compression to induce contact of the plurality of accordion pleats with the CFRP hole and threaded element; and,
   trimming length of the tubular element for a bushing to accommodate any contraction of the tubular element created by the deformation and for maintaining elastic deformation in the bushing when compressed in service.

15. The method of claim 14 wherein the step of deforming the tubular element further comprises:
   determining a number and depth of the accordion pleats to accommodate required expansion for firm electrical contact with both a pass through and a CFRP hole when compressed by a nut and bearing washer.

16. The method of claim 14 wherein the step of deforming the tubular element further comprises:
   contouring a vertex of the accordion pleats to provide a bight which flattens against an opposing surface.

17. The method of claim 14 further comprising:
   external finishing or scoring for deformation control of the bushing.

18. The method of claim 14 wherein the step of deforming the tubular element further comprises forming the accordion pleats with both end portions of the tubular element terminating at an inner diameter to be closely received by the externally threaded element.

19. The method of claim 14 wherein the step of deforming the tubular element further comprises forming the accordion pleats with both end portions of the tubular element terminating at an outer diameter to be closely received by a CFRP hole.

* * * * *